United States Patent Office 3,120,495
Patented Feb. 4, 1964

3,120,495
PROCESS FOR PREPARING A MICROSPHEROIDAL ALUMINA BASE MATERIAL
William B. Innes, Stamford, Conn., assignor to American Cyanamid Company, New York, N.Y., a corporation of Maine
No Drawing. Filed Nov. 13, 1959, Ser. No. 852,617
4 Claims. (Cl. 252—448)

The present invention relates to microspheroidal alumina base material, and more particularly to microspheroidal alumina base material adapted for use in the preparation of catalysts suitable for use in the catalytic reforming of petroleum feed stocks. While the present invention will be described more fully in connection with platinum reforming catalysts, it should be recognized that the alumina base material may be employed with other catalytically active materials.

Platinum catalysts, in general, are used by the petroleum industry to upgrade virgin naphthas for the production of motor fuels and for the production of aromatic hydrocarbons. A usually preferred naphtha feed is a 200–450° F. cut of Mid-Continent crude. Also naphthas from other crudes such as Texas, California, or Kuwait may be used. Mid-Continent crudes are quite plentiful, and contain a large amount of naphthenes, as for example, about 40%. These naphthenes are convertible to corresponding aromatics by dehydrogenation under reforming conditions. Other reactions which normally take place in reforming are hydrocracking of paraffins, isomerization of paraffins, and dehydrocyclization of paraffins to aromatics. In a typical reforming run, a Mid-Continent crude naphtha having an unleaded Research octane rating of 35–40 units is converted to a motor fuel which has an octane rating of 85–100 units.

Most, if not all, platinum reforming catalysts today are employed in fixed bed operations where they are in the form of pills, pellets or beads. Alumina sol is a recognized precursor for such catalysts in that catalysts made from sol have demonstrated excellent preformance in the regenerative Ultraforming process.

Fluid platinum reforming catalysts are not in use today, in that while the pelleted alumina sol base catalyst is characterized by good stability, attrition resistance of spray dried alumina sol is unacceptably poor. Keeping in mind that platinum is an expensive catalytic agent, poor attrition resistance is readily translated into excessive "stack losses" of this metal.

The alumina sols referred to have long been employed to prepare catalyst base materials, particularly for the reforming of petroleum feed stocks. These alumina sols are normally prepared by "cooking up" aluminum metal, acetic acid and minor amounts of mercury to form the sol. Such processes are well known to those skilled in the art and are described in such issued patents as Reissue Patent No. 22,196 and Patents Nos. 2,404,024 and 2,408,724.

Accordingly, it is an object of the present invention to provide a process whereby alumina sol may be readily converted so that it may be spray dried and yet be characterized by excellent attrition resistance.

It is a further object of this invention to provide a spray dried alumina resulting from such a process, which may be activated with platinum and other catalytically active material, whereby a commercially acceptable fluid microspheroidal catalyst is provided, characterized by good attrition properties and stability to steam regeneration. The availability of such catalysts makes possible markedly improved gasoline yields and through puts with existing fluid hydroformers than presently realized with molybdena catalysts. It also makes feasible operations at lower pressure or on higher boiling feedstocks which give higher gasoline yields but result in more frequent requirements for catalyst regeneration due to coke deposition on the catalyst. With a fluid bed process, frequent regeneration is effected quite readily on a continuous basis even on a large scale (e.g,. fluid catalytic cracking).

It is a still further object to provide such a catalyst containing platinum, which may be practically commercially adapted for use in processes employing continuous regeneration techniques.

These and other objects and advantages of the present invention will become more apparent in the detailed description thereof set forth hereinbelow.

In accordance with the present invention, a process is provided for preparing microspheres of alumina suitable for use as a catalyst base material characterized by good attrition resistance, which comprises alkalizing to a pH of between 8.5 and 10.5 an alumina sol, and thereafter spray drying the alkalized alumina sol.

As noted hereinabove, unless the alumina sol is treated in accordance with the process of this invention, the spray dried particles have poor attrition resistance and shatter to the extent that they are commercially unacceptable for use in fluid reforming cracking processes.

The alumina sols contemplated by the present invention may be freshly prepared alumina sols such as those described in the above referred to patents. The sols contain excess acetic acid and usually have a pH between 2 and 6 and usually between 2.5 and about 3.5. The present unexpected effect may be achieved by employing aqueous solutions of any of the better known organic or inorganic alkaline agents. Ammonia or nitrogen containing alkaline materials such as methylamine, ethylamine, butylamine, ethanolamine, are greatly preferred in that, in general, no complications are encountered with respect to their removal. However, solutions of alkali and alkaline earth metal oxides are clearly contemplated, providing later steps are taken to exchange out the alkali metal ion. The alkalizing or neutralizing treatment is carried out until the pH of the sol is from between 8.5 and 10.5 and until it is converted to a gel slurry. Preferably, the neutralized sol is characterized by a pH of from between 9 and 10.

In accordance with the present specification and claims, the term "alumina sol" refers to a colloidal dispersion which is macroscopically homogeneous and opalescent in appearance, and is further characterized by true flow properties or flow properties of a true liquid, and which may be prepared in accordance with any of the above cited patents.

By the term "alumina gel" as it is employed herein, it is meant a composition of matter which may be generally characterized by or of the properties of a sol with the exception of its flow properties. With respect to the gel, its flow properties are those of an elastic solid, i.e., a non-rigid solid.

By the term "gel slurry," it is meant a composition of matter characterizable as a mixture of a liquid and gel particles and having thixotropic properties.

In accordance with the present invention, the neutralized alumina sol is then spray dried. Spray drying may be accomplished by spraying the composition through a nozzle or off a spray wheel into contact with hot gases. Such drying may be accomplished by any suitable spray drier. One that has been employed with success is described in U.S. Patent No. 2,644,516, dated July 7, 1953. Also, gas inlet temperatures of up to 1300° F. may be employed. The temperatures of the drying gases entering the spray drying chamber are preferably controlled within the range of about 400 to 1000° F. so that the alkalized alumina sol is converted into a set, partially dehydrated microspheroidal gel particle. Spray drying usually results in a moisture content of from between 7 and 20%.

As indicated heretofore, the microspheres of alumina prepared in accordance with the present invention are ideally suited for the preparation of reforming fluid cracking catalysts, and thus may be impregnated with numerous catalytically active materials, such as platinum, molybdena, chromia, vanadia, and the like. With respect to the present invention, a particularly preferred aspect thereof resides in the preparation of fluid platinum containing reforming catalysts characterized by high activity and stability to steam regeneration and high attrition resistance.

According to the present invention, the spray dried alumina resulting from the spray drying of the neutralized or alkalized alumina sol is impregnated with a suitable catalytically active material, and for purposes of illustration of the present invention, details will be confined to impregnation with platinum, although it should be remembered that other activating metals and particularly the noble metals such as palladium, rhodium, iridium may be employed similarly. The spray dried alumina may be impregnated with a suitable platinum compound, either from an aqueous or solvent solution of such a compound, by spraying of the platinum compound thereon, immersion of the spray dried alumina in the solution or by any other means whereby reasonably even or uniform distribution of the catalytic agent on the base may be insured.

With respect to platinum, chloroplatinic acid, bromoplatinic acid, platinum tetrachloride, platinum dichloride or other soluble sources of platinum may be employed. These materials or their equivalents are employed in such amounts as to impregnate the base with from between about .03 up to about 1% of platinum, based on the final weight of the catalyst composition. More preferably, amounts of from between 0.08 and .8% are employed.

In order that the present invention may be more fully understood, the following examples are given primarily by way of illustration. No details or enumerations contained therein should be construed as limitations on the present invention, except insofar as they appear in the appended claims. All parts and percentages are by weight unless otherwise clearly indicated.

EXAMPLE 1

20 lbs. of HgO was added to a dilute solution of acetic acid containing 19 lbs. of 85% acetic acid and 100 gallons of water. This mixture was in turn added to 30.0 pounds of aluminum metal. Solution of the metal takes place with the formation of an alumina sol over a 15-hour period, when the temperature is held at 70–80° C. with agitation. The resulting sol had a pH of about 3.

The resulting sol was homogenized at 2000 p.s.i. and spray dried without neutralizing.

EXAMPLE 2

An alumina sol is prepared as described in Example 1.

To 29.2 parts of the alumina sol (about 7% of aluminum oxide), 11.2 parts of a 10% ammonium hydroxide solution is added. The addition takes place over a 10-minute period, and after standing for one hour, is spray dried. The pH of the gel slurry after one hour standing is 9.0.

EXAMPLE 3

The same procedure as is employed in Example 2 is employed herein, except that the neutralized gel slurry is homogenized with a homogenization valve at a pressure of 2000 p.s.i. immediately before spray drying.

Homogenizing, as referred to in Examples 1 and 3, refers to passage of the gel slurry or neutralized sol through an ordinary spring loaded homogenizing valve and the pounds per square inch reported therein refers to the pressure drop across the homogenization valve. Homogenization is employed in an attempt to comminute the particles and obtain a catalyst base material characterized by a higher order of density.

In order to illustrate the unexpected improvement in attrition resistance resulting from the process of this invention, tests were made. The test for attrition resistance has been described in U.S. Patent No. 2,768,125. The value is obtained by placing a known amount of catalyst material of predetermined weight, such as a 50-gram sample, in a hollow cylinder supported on a disk with three .015 inch diameter holes. A stream of air is then turned on so that 15 cubic feet/hour of air passes through the holes, producing high velocity air jets which effect attrition similar to commercial operations. Periodically, at any desired time and in the present test, at 45 hours, the flask-filter collection system containing elutriated fines under 15 microns, is removed and weighed. The values are then used to calculate percent overhead and such a factor is a good measure of the attrition resistance of the catalyst base material when the initial fines are taken into account. The lower the percent of overhead, the higher is the attrition resistance of the catalyst.

The results of this test and others are reported in Table I hereinbelow.

*Table I*

| Material | Spray Dry | | | Ave.[1] Part. Size | Percent[1] −20μ | Percent[1] +80μ | Percent Overhead, 45 Hrs. | S.A., M²/gm. | P.V., cc./gm. |
|---|---|---|---|---|---|---|---|---|---|
| | Ex. No. | Pressure | | | | | | | |
| | | Homo. | Line | | | | | | |
| Unneutralized Sol | 1 | 2,000 | 600 | 40 | 4 | 17 | ² 50+ | 302 | 0.56 |
| Neutralized Sol | 2 | | 700 | 45 | 6 | 3 | 9 | 289 | 0.57 |
| Do | 3 | 1,500 | 700 | 45 | 8 | 3 | 18 | 293 | 0.58 |

[1] By Micromesh sieve—Method E 11, ASTM Meeting No. 61 (Spring 1958). Report by Daeschner, Seibert and Peters.
[2] Top blew off overnight so that true values are higher.

It will be seen from Table I hereinabove that the present invention produces an unexpected and marked improvement in the attrition resistance of the alumina catalyst base material. Thus, it will be seen that at the time of 45 hours, catalysts prepared in accordance with the present invention have an indicated maximum percentage overhead of less than 20%, while that base material not prepared in accordance with the present invention is characterized by a percentage overhead of at least 50%. It should be noted that in the obtaining of these percentages that the percent overhead includes catalyst fines which were not selectively removed from the sample as charged to the testing unit. It is believed that of the percents overhead reported for Examples 2 and 3 about one half of the −20μ fraction would be elutriated in any case without any attrition.

As is generally well known, the effectiveness of platinum-containing reforming catalysts, insofar as activity and selectivity are concerned, is in general improved by effecting their use in the presence of halogen, as for example, bromine, chlorine or fluorine, within specified limits. A suitable halogen may thus be employed by impregnating the catalyst material therewith or by introducing the halogen containing material into the catalyst or vaporized petroleum feed stock streams. Additionally, hydrochloric acid or its equivalent may be introduced in a continuous manner in a continuous regeneration type unit prior to the transfer of regenerated catalyst back into the cracking unit. With respect to this last mentioned alternative, distribution of the halogen does not constitute a problem, since the catalyst is well mixed therein.

In general, the amount of halogen employed may be from between about .05 to about 3%, based on the weight of the catalyst material, whether present therein or whether separately added to a cracking process, as for example, into the cracking unit. Preferably, the amount is from between about 0.5 to about 1.5%.

EXAMPLE 4

334 parts of the spray dried neutralized alumina sol base of Example 3 where impregnated with an aqueous solution containing 6.7 parts of a 5% solution of chloroplatinic acid, 4.2 parts of aluminum chloride, and 187 parts of water.

In this impregnation, the chloroplatinic acid and the aluminum chloride were added to the water and the solution was added in small increments to the spray dried powder, while agitating the powder by suitable mixing means. The volume of impregnant was such to just fill the pores. The impregnation was effected over a 15-minute period. Thereafter, the catalyst mixture was oven-dried overnight at a temperature of 250° F. and calcined in a muffle furnace for one hour at 1100° F.

The resulting catalyst contained .1% platinum and .6% of chlorine, based on the weight of the catalyst material.

EXAMPLE 5

The same procedure as was employed in Example 4 was employed herein, except that 329 parts of the alumina base prepared in Example 2 was impregnated with an aqueous solution containing 13 parts of a 5% chloroplatinic acid solution, 4.4 parts of aluminum chloride and 177 parts of water.

The impregnation was carried out by the procedure set fourth in Example 4, and the catalyst dried and calcined in the same manner.

The resulting catalyst contained 0.2% of platinum and 0.72% of chlorine, based on the weight of the catalyst composition.

EXAMPLE 6

224 parts of the catalyst material prepared in Example 4 was further impregnated with an aqueous solution containing 13.4 grams of a 5% solution of chloroplatinic acid, 1.5 grams of aluminum chloride and 117 parts of water.

The same procedure in mixing and calcining as was employed in Example 4 above was employed here.

The final catalyst contained 0.4% platinum and 1.0% chlorine, based on the weight of the final catalyst composition.

Catalyst A, identified in Table II hereinbelow, is a commercially available fluid molybdenum oxide-alumina reforming catalyst and is incorporated in the present tables to point out the significant advantage of catalysts of this invention over the most competitively available fluid reforming catalysts. This catalyst contains 10% $MoO_3$ and the balance is alumina. Here it should be noted that fluid molybdena reforming catalysts are the only fluid reforming catalysts presently available.

In order to illustrate the superiority of reforming catalysts prepared in accordance with the present invention, the catalysts identified in Examples 4–6 above were compared with Catalyst A in a series of runs conducted at 200 p.s.i. of hydrogen pressure in the reforming of Mid-Continent naphtha identified as CR 300 A and CR 450, respectively. These stocks had the following inspection data:

| Feedstock | CR 300 A | CR 450 |
|---|---|---|
| Initial B.P., ° F | 197 | 205 |
| 10% | 233 | 239 |
| 90% | 324 | 322 |
| End pt | 358 | 363 |
| Aniline Pt, ° F | 133 | 133 |
| Sulfur | .02 | .02 |
| Research Octane | 44 | 44 |
| Percent Paraffins | 48.0 | 53.5 |
| Percent Naphthenes | 44.5 | 38.0 |
| Percent Aromatics | 7.5 | 7.5 |
| Percent Olefins | tr | 1.0 |

CR 300 A was employed with second Catalyst A at the lower space velocity and CR 450 was employed with the remaining catalysts. Performance on these two feed stocks is found to be substantially identical.

The catalysts were retained in the units for the number of days indicated, as for example, the catalyst of Example 4 was retained in the unit and measurements made of its catalytic effectiveness for the second, third and fourth days. The data for the catalyst identified in Example 5 were only obtained after one day in the unit, in that its comparative measure of effectiveness was already established thereby.

The result of these runs are illustrated in Table II hereinbelow.

Table II
SUMMARY OF ALL PRODUCT DISTRIBUTION RUNS

| Sample Run No. PC | Ex. 4, 2 days | Ex. 4, 3 days | Ex. 4, 4 days | Cat. A | Cat. A | Ex. 5, 1 day | Ex. 5, 1 day | Ex. 6, 1 day |
|---|---|---|---|---|---|---|---|---|
| Vol. Percent $C_5+$ | 78.8 | 76.4 | 81.6 | 84.9 | 70 | 81.9 | 84.0 | |
| Vol. Percent $C_4$ | 8.4 | 11.3 | 8.9 | 3.8 | | 6.5 | 5.5 | |
| Wt. Hourly Space Velocity | 2.0 | 2.0 | 2.0 | 2.0 | 0.6 | 2.0 | 2.0 | |
| Research Octane (Clear, i.e., w/o lead) | 93.5 | 92.7 | 92.3 | ca. 80 | 95 | 96.5 | 94.2 | |
| Average Temp., ° F | 900 | 900 | 900 | 900 | 900 | 900 | 900 | |
| 0–20 hr. Wt. Act | 77 | 77 | 68 | 1 20 | 1 25 | 142 | 116 | 256 |
| Percent Pt | 0.1 | 0.1 | 0.1 | 0.0 | 0.0 | 0.2 | 0.2 | 0.4 |
| Percent Cl | .60 | | | | | .72 | | 1.0 |

[1] On the basis of a 4-hr. test for Cat. A vs. 20 hr. for Pt catalyst. Cat. A activity was <32.

A review of Table II hereinabove indicates a very high research octane or activity for catalysts of this invention when compared with a commercial molybdenum oxide alumina reforming catalyst at same temperature and space velocity.

For a given research octane number, plots of yield versus octane show that volume percent of $C_5+$ is markedly higher for the platinum catalyst than that for commercial molybdena catalyst.

In a similar reforming test unit to the one used for obtaining the data of Table II, the catalyst of this invention was compared with a commercial extruded platinum reforming catalyst at 350 lbs. per square inch of hydrogen and a two weight-hourly space velocity. Over the range 90–100 octane (clear, i.e., without lead) of reformate, the fluid catalyst exhibited a consistent 2% yield advantage as compared to the formed catalyst.

"Activity 0–20 hrs. weight basis" is a corrected activity and is a standard method of evaluating the activity of a catalyst and provides a measure of naphtha through put for a given weight of catalyst to realize a given Research Octane.

Present day catalytic reforming using platinum catalyst is generally carried out under hydrogen pressures from about 300 lbs. per square inch to over 500 lbs. per square inch. Hydrogen is employed in reforming processes in general to prevent excessive coke laydown on the catalyst. At the upper end of this range, the laydown of coke on the ecatalyst is sufficiently slow so as to avoid the necessity for frequent regeneration of the catalyst. However, at the same end of the range, yields of reformate are lower for a given octane than those obtained at lower hydrogen pressures. In order to take advantage of the yield differences, low pressure processes also exist in which it is necessary to operate with multiple reactors in order to be able to have under regeneration at all times some portion of the catalyst charge. The use of a fluid platinum catalyst permits practically continuous regeneration of the catalyst and thereby permits the use of even lower pressures of hydrogen, namely below 300 lbs. per square inch that the attendant advantages of still higher yields for a given octane.

Thus it is a particular advantage of the present invention that the catalyst described herein permit catalytic reforming of petroleum feed stocks at low hydrogen pressures, as for example, pressures of form between about 0 to about 300 pounds per square inch and more particularly, from between about 100 p.s.i. to about 300 p.s.i.

Reforming today in general is carried out under the hydrogen pressures above discussed and at temperatures within the range of between about 700° F. and 100° F. Such a range is suited for the use of the catalyst of this invention in the reforming of hydrocarbons.

This application is a continuation-in-part of my copending application, Serial No. 778,318, filed December 5, 1958, now abandoned.

I claim:
1. A process for preparing microspheres of alumina, characterized by good attrition resistance, which comprises alkalizing to a pH of between 8.5 and 10.5, with an alkaline agent, an acidic alumina sol to convert said sol to a gel slurry, and thereafter spray drying the gel slurry so produced.
2. A process according to claim 1, in which neutralization is carried out to a pH of between 9 and 10 with ammonia.
3. A process according to claim 1, in which the microspheres of alumina prepared by spray drying the gel slurry are platinized with from between .03 and 1% of a soluble platinum compound, and thereafter calcined to form a fluid alumina platinum catalyst.
4. A process according to claim 3 in which the catalyst contains from between .05 and 3% of halogen.

References Cited in the file of this patent
UNITED STATES PATENTS

| | | |
|---|---|---|
| 2,630,404 | Berger | Mar. 3, 1953 |
| 2,703,315 | Murray et al. | Mar. 1, 1955 |
| 2,760,912 | Schwarzenbek | Aug. 28, 1956 |
| 2,840,529 | Lefrancois | June 24, 1958 |
| 2,865,866 | Hoekstra | Dec. 23, 1958 |
| 2,890,179 | Kimberlin et al. | June 9, 1959 |
| 2,959,536 | Brennan et al. | Nov. 8, 1960 |